June 18, 1957  E. A. STALKER  2,796,214
AXIAL FLOW MACHINE FOR INCREASING THE PRESSURE
OF AN ELASTIC FLUID
Original Filed June 21, 1948  2 Sheets-Sheet 1

INVENTOR.
Edward A. Stalker

June 18, 1957　　　　E. A. STALKER　　　　2,796,214
AXIAL FLOW MACHINE FOR INCREASING THE PRESSURE
OF AN ELASTIC FLUID
Original Filed June 21, 1948　　　　2 Sheets-Sheet 2
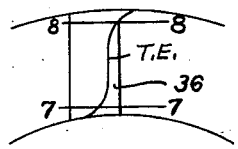
Fig.6
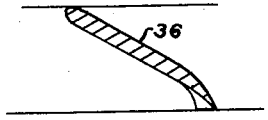
Fig.7
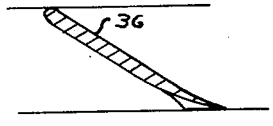
Fig.8
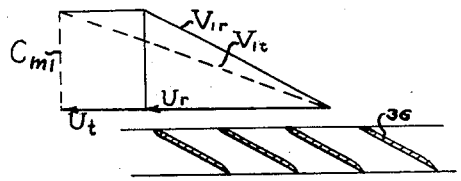
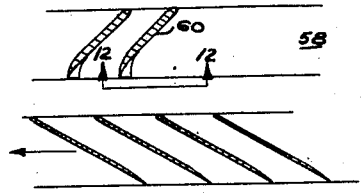
Fig.11
Fig.9
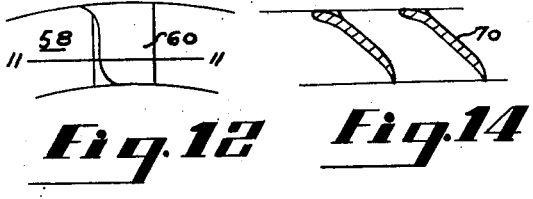
Fig.12　　Fig.14
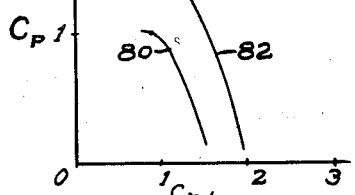
Fig.15
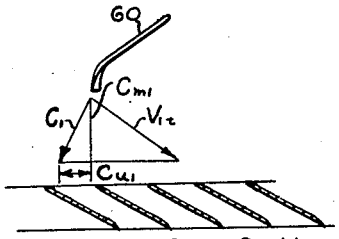
Fig.13
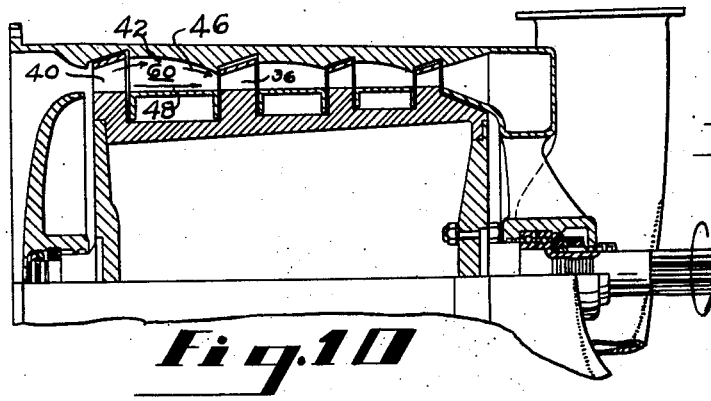
Fig.10
INVENTOR.
Edward A. Stalker

United States Patent Office 2,796,214
Patented June 18, 1957

2,796,214

AXIAL FLOW MACHINE FOR INCREASING THE PRESSURE OF AN ELASTIC FLUID

Edward A. Stalker, Bay City, Mich.

Original application June 21, 1948, Serial No. 34,174. Divided and this application March 22, 1954, Serial No. 417,689

2 Claims. (Cl. 230—122)

This invention is a division of my application Serial No. 34,174, filed June 21, 1948.

This invention relates to machines for increasing the pressure of a fluid commonly called compressors and blowers.

An object of the invention is to provide a low cost machine of high efficiency providing a high pressure rise of the pumped fluid.

Another object is to provide an accelerating stator for extending the range of operation of the machine.

Other objects will appear from the specification, drawings and claims.

I accomplish the above objects by the means illustrated in the accompanying drawings in which:

Figure 6 is the rear view of a blade in elevation;

Figure 7 is a section of the blade along the line 7—7 in Figure 6;

Figure 8 is a section of the blade along the line 8—8 in Figure 6;

Figure 9 is the vector diagram for the root and tip sections of the blade in Figure 6;

Figure 10 is an axial part section through a multistage radial diffusion rotor with curved blades like those of Figure 6 and with special stators;

Figure 11 is a fragmentary development of a radial diffusion stage showing another form of stator blade;

Figure 12 is a view from the line 12—12 in Fig. 11;

Figure 13 is a vector diagram for the flow past the tip portions of the stator blades of Figure 11 shown in relation to a rotor stage;

Figure 14 shows still another form of rotor blade having twisted leading edge portion; and Figure 15 shows the curves of pressure coefficient versus the flow parameter for a peripheral diffusion compressor and a radial diffusion compressor.

Figure 1:
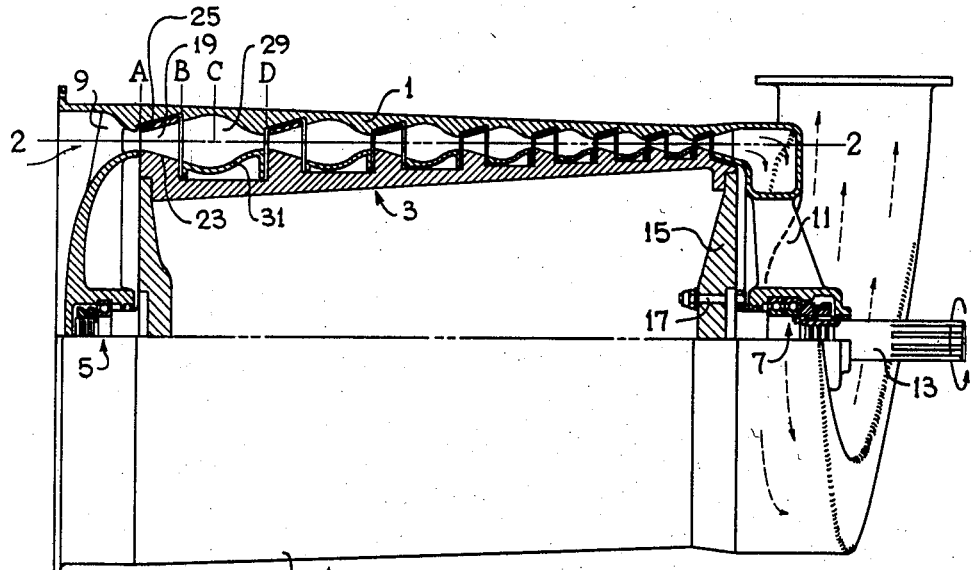
Figure 1 is a vertical quarter section of an 8-stage compressor, showing the axial disposition of the various stages.

Other applications which have been filed show the means of pumping by rotor passages diffusing by means of radial expansion. These are Serial No. 593,631, filed May 14, 1945, now Patent No. 2,648,492, Serial No. 624,013, filed October 23, 1945, now Patent No. 2,648,493, Serial No. 687,385, filed July 31, 1946, now Patent No. 2,732,999, and Serial No. 794,018, filed December 26, 1947, now Patent No. 2,749,027. The present application differs from the preceding in disclosing a multi-stage arrangement of radial diffusion rotor stages and stators, and in special shapes of rotor and stator blades as well as differently shaped stator passages.

All present day multiple-stage high performance axial-flow compressors use curved blades or vanes forming curved expanding passages between them. The passages expand peripherally. The diffusing therefore takes place peripherally in a peripherally curved passage against a rising pressure. This leads to poor local efficiencies and definitely limits performance in regard to the permissible pressure ratio per stage. When efficiency is required, the fabrication costs of a compressor utilizing curved blades of the type required by peripheral diffusion weigh against their consideration for use in many commercial applications.

The compressor as shown consists of outer stator support case means 1 from which the rotor drum assembly 3 is supported by means of bearing assemblies 5 and 7 and support vanes 9 and 11. The rotor assembly 3 is driven in the direction indicated on Figure 1 by means of splined shaft 13 supported by bearing assembly 7 and attached to end plate 15 of rotor assembly 3 by means of bolts 17.

All compressor stages are similar, so, for simplicity of explanation, only the first stage of the compressor need be described. In the following discussion air will be assumed as the medium for compression, although this compressor could be designed to pump any compressible fluid—or a non-compressible fluid, if desired, in which case all stages would be identical.

Figure 4:
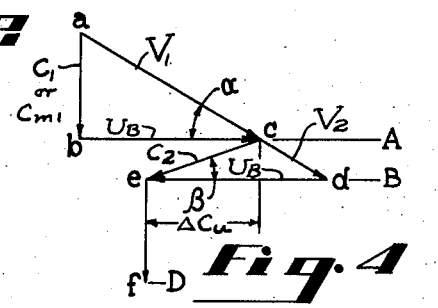
Figure 4 shows a typical vector diagram for a single compressor stage operating at design conditions.

Inducted air enters the compressor past the streamlined support vanes 9, arriving at plane "A," Figure 1, with an axial velocity of $ab=C_1$ as shown in the vector diagram of Figure 4. The blade peripheral velocity $U_B$, represented by velocity vector $bc$, when added vectorially to axial velocity $C_1$, gives an oblique relative entering velocity of $ac=V_1$ at angle $\alpha$ with respect to plane "A" at the entrance to the rotor stage as shown in Figure 4.

Figure 2:
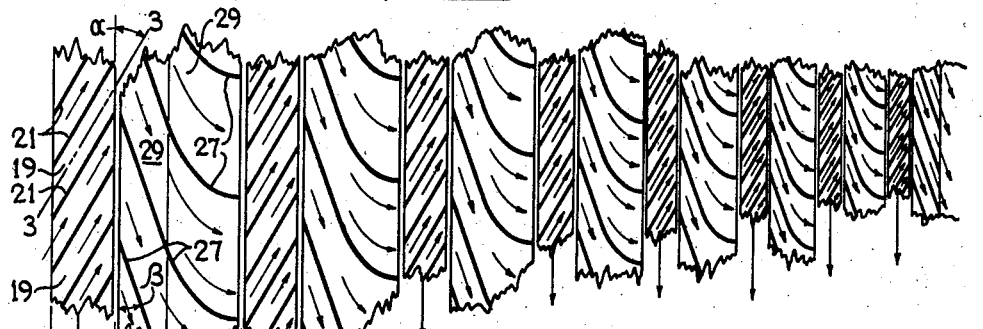
Figure 2 is an enlarged fragmentary developed view of the compressor rotor and stator vanes looking inboard normal to a plane represented by line 2—2 of Figure 1.
Figure 3:
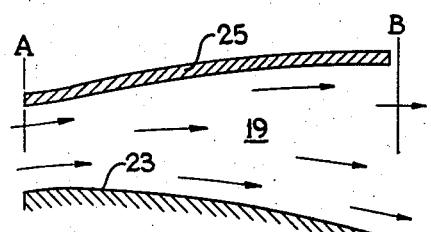
Figure 3 is an enlarged radial section of a typical rotor straight diffuser passage taken along center line 3—3 of Figure 2.

Referring to Figures 1 and 2, the oblique rotor diffuser passages 19 between planes "A" and "B" are formed by the surfaces of the oblique straight vanes or blades 21 at angle $\alpha$ to plane "A," the rotor-drum outer-truncated cone surface 23, and the outer-truncated cone-shaped ring 25, both of the latter being rounded at the entrance following plane "A" so as to give a smooth approach to the expanding portion of the diffuser passage 19. The ring 25 is comprised, when present, in the case means 1. Figure 3 shows an enlarged radial section of a typical rotor stage straight diffuser passage taken along center line 3—3 of passages 18, Figure 2. It will be noted that the rotor blades 21 in the developed view of Figure 2 are parallel.

Thus, by the time the air reaches plane "B" leaving the rotor stage its relative velocity with respect to the exit of rotor stage vanes 21 has been reduced to a value represented by relative velocity vector $cd=V_2$ of Figure 4. Subtraction of the blade velocity $U_B$ represented by velocity vector $de$ gives an absolute leaving velocity represented by velocity vector $ce=C_2$ at angle $\beta$ to plane "B." This is the entering velocity vector to the stator blades or vanes 27, Figure 2, of which the initial portion from planes B to C makes an angle of $\beta$ with respect to plane B. It is the purpose of the stator passages 29, formed by the surfaces of the vanes 27, the stator inner wall defining the internal shroud 31 and the case means 1, to initially diffuse the air to a low velocity in a straight line from planes B to C and then to make an accelerating turn from plane C to the exit plane D such that the air leaves the stator in an axial direction at plane D with a velocity vector $ef$, Figure 4, essentially equal to the initial entrance velocity vector $ab$ so as to be ready to repeat the same vector pattern in the next stage of compression. This necessitates a sinusoidal type contraction, occurring between planes O and D in Figure 1, designed such that there is a continually decreasing equivalent area of flow as the air passes from plane C to plane D.

The static pressure rise for a stage is $$P = \rho U \Delta C_u \quad (1)$$

where $\rho$ is the mass density of the fluid and $\Delta C_u$ is the net change in peripheral velocity of the fluid. U is the peripheral velocity of the rotor at the diameter where $\Delta C_u$ is measured. Ordinarily it is the mean diameter.

In Figure 4 the absolute velocity is $C_1$ which in this case is identical with the absolute axial velocity $C_{m1}$. $\Delta C_u$ is the peripheral component of the absolute vector $C_2$ equal to ce.

Figures 1 and 3 show the passage 19 with walls diverging equally with respect to the line 2—2. They also show the inner wall 23 as straight axially but curved as a result, along line 3—3. Where it is desired to make the angle of divergence of the walls quite large so as to shorten the machine still more all the divergence may be given to the outer wall (of passage 19) and the inner wall may be made straight in the direction 3—3 of Figure 2. The centrifugal pressure of the air will suppress the tendency for the flow to separate from the outer wall, making it possible for this wall to diverge quickly from line 2—2.

In this form of this invention the flow in the stator is expanded and reduced in velocity where the vanes are substantially straight and accelerated where they are curved. By accelerating the flow at the turn, the boundary layer is persuaded to stick to and follow the convex side of the vanes. This eliminates separation of the flow with its attendant loss of head.

Figure 5:
Figure 5 shows a method of fairing the entrance noses of the various vanes so as to increase the off design performance of the unit.

The compressor of Fig. 1 may be given other blade forms than those shown in Figs. 2 and 5. The forms of these figures are suitable for small hub ratios, that is the ratio of the hub diameter to the tip diameter of the rotor stage. For best efficiency the hub ratio is not smaller than about 0.85 when the blades are simple flat sheets.

The hub ratio may be made smaller, of the order 0.7, by curving at least a portion of each blade.

In one example shown in Figs. 6 to 8 the trailing edge (T. E.) of the rotor blade 36 is twisted so that the blade does not contribute quite as much whirl velocity $\Delta C_u$ to the air at the blade tip as at the blade root. Secions at the root and tip are shown in Fig. 7 and 8 respectively.

The vector diagram for the blade of Fig. 6 is shown in Fig. 9. The axial velocity $C_{m1}$ is the same for root and tip section. The peripheral velocities are $U_r$ and $U_t$. The relative velocities are $V_{1t}$.

The whirl velocity $\Delta C_u$ added to the air by the blades of the rotor stage is $\Delta C_{ut}$ and $\Delta C_{ur}$ for the root and tip sections respectively because of the twist. If the blade were not twisted the product $U\Delta C_u$ would be different for the root and tip portions of the blade and losses would result since the only manner of equalizing the head added to the fluid would be by turbulent mixing—a wasteful process. With the twisted blade the head added is the same at root and tip although the division of total head, between dynamic and static head is different for tip and root portions of the blade. This is so since $C_{2r}$ and $C_{2t}$ are different in magnitude.

To convert the dynamic head added by each rotor stage, stators of special design are required.

The stator passages 42 shown in Fig. 10, do not have a radially expanding inlet portion but each has a radially decreasing width or depth from inlet to exit.

The stators shown in Fig. 10 are designed to bring the flow received from the rotor to a constant axial velocity along the radial extent of the blade at the trailing edge.

Thus fluid received from rotor stage 40 flows through the stator passage 42 which is curved along its outer surface so that the streamlines 46, Fig. 10, originally having the velocity $C_{2t}$, are increased in velocity with a resultant decrease in static pressure. This curvature tends to bring the flow to equality with the velocity and static pressure of the streamlines 48 originally having the velocity $C_{2r}$.

The rotor stages and blades of Fig. 10 are similar to those of Figs. 1 and 2. The stator blades as seen in the developed view are similar to the blades 27 of Figure 2.

The portion of the case means radially opposite the stator blades converges toward the axis of rotation more than the shroud at the radially inner ends of the stator blades diverges outward from said axis so that some of the flow in each stator passage has a radial component of velocity toward said axis. That is the flow becomes curved in axial planes at the entrance to the rotor passages creating a centrifugal pressure acting toward said axis. This latter pressure persists into the rotor passages because of the fluid inertia and opposes the fluid contrifugal pressure arising from the rotation about the rotor axis.

As shown in Figs. 11, 12 and 13 the stator structure 58 may have blades 60 twisted along the trailing edge to serve the purpose of permitting the rotor stage to add equal amounts $U\Delta C_u$ at the root and tip portions. It is to be recalled that $C_u$ is the increment of whirl velocity added by the rotor stage. Heretofore the absolute velocity ahead of the rotor stage has been taken as axial. This need not be the case and in Figs. 11 and 12 the tip portions of the stator blades direct the flow in the direction of rotor blade rotation and against the direction of rotation at the root. This reduces the effective whirl velocity at the tips and increases it at the root. In Fig. 13 the fluid has the initial peripheral component $C_{u1}$ while the rotor stage adds the amount $C_{u2}$. Then $$\Delta C_u = C_{u2} - C_{u1}$$

This is the condition for the rotor blade tip portions. Obviously this reduces the total head added to the flow past the tip portions of the blade and may be used to bring the head into equality with that of the fluid flowing past the root portions.

Various combinations of stator and rotor blade twist may be employed and as shown on blade 70 in Fig. 14 the leading edge portions may be twisted.

In order to keep the overall diameter within certain limits it may be desirable to use a smaller diffusion through the rotor in the earlier stages as compared to the later or downstream stages. Thus the ratio of exit area $A_2$ to inlet area $A_1$ of the passage through a rotor may be of the order of 1.25 for the first stage and 3 for the last stage with a progressive increase in the value between the outer stages.

The radial diffusion rotor stage is characterized by the expansion of the fluid radially as it flows through the rotor stage passages. The inlet of each passage of a stage is at substantially the same radius as the exit thereof. The axial length of a rotor stage is ordinarily of the order of the maximum radial depth of the flow passage of a rotor stage. Furthermore the axial length of the rotor stage is small compared to the diameter of the rotor stage, preferably a minor portion of the diameter.

Figure 15 shows the curves of pressure coefficient $C_p$ versus flow parameter for a peripheral diffusion of conventional axial flow compressor and for a radial diffusion compressor. They are respectively curves 80 and 82. This coefficient is found by dividing the pressure rise of the stage by $\rho U^2/2$.

As shown in Fig. 10 the compressor passages are dissymmetrical. The stator outer wall converges inward toward the axis of rotation and the rotor shroud diverges outward. Accordingly the flow from the stator into the rotor is convex toward the axis of rotation and causes an inward centrifugal pressure acting toward the axis of rotor rotation. This inward pressure acts against the outward centrifugal pressure from the rotation of the rotor and reduces the static pressure in the neighborhood of the blade tips so that a greater volume of flow will pass through the rotor. The volume flow per revolution is an important characteristic of an axial flow compressor.

Referring again to Fig. 10 the stator portion of the case opposite the stator blades between two axially spaced rotor stages converges toward the axis of rotation in the downstream direction and provides a component of fluid pressure acting away from the case means and toward the axis. This component, because of inertia in the fluid, will reduce the pressure in the rotor stage passages at the tip or outer ends of the blades which will increase the flow through the rotor and improve the distribution of angles of attack of both the rotor and stator blades.

While I have illustrated a specific form in this invention it is to be understood that I do not intend to limit myself to this exact form but intend to claim my invention broadly as indicated by the appended claims.

What I claim is:

1. In combination in an axial flow machine for increasing the pressure of a fluid, a case means, a hub means mounted within said case means with the peripheral surface thereof spaced from said case means defining an annular passage for conducting a main flow of fluid, a plurality of peripherally spaced axial flow blades carried on said hub means defining a plurality of rotor stages each with rotor passages between said blades, said plurality of rotor stages comprising an upstream stage and an adjacent downstream stage, a stator stage positioned between said upstream and downstream rotor stages comprising a plurality of peripherally spaced stator blades with stator passages therebetween bounded by a stator portion of said case means, and means to offset centrifugal pressure in said fluid at said case means arising from rotation of said downstream rotor stage comprising said stator portion of said case means positioned upstream adjacent to said downstream rotor stage and a stator passage inner wall spaced radially inward from said case means for directing flow of said fluid into said downstream rotor stage passages, said stator portion converging toward said axis in the downstream direction more than said inner wall diverges outward from said axis and cooperating with said stator portion to give said flow convex streamlines relative to said axis in axial planes thereby producing centrifugal pressure in said fluid in said downstream rotor stage acting away from said case means and toward said axis, said rotor blades along substantially the whole tips thereof conforming closely to the inner surface of said case means to sustain a substantial pressure difference between the front and rear sides of said rotor, said blades said case means and said hub means cooperating to provide each said rotor passage at the exit thereof with a greater radial depth and cross sectional area than at the inlet of said passage.

2. In combination in an axial flow machine for increasing the pressure of a fluid, a case means, a hub means mounted within said case means with the peripheral surface thereof spaced from said case means defining an annular passage for conducting a main flow of fluid, a plurality of peripherally spaced axial flow blades carried on said hub means defining a plurality of rotor stages each with rotor passages between said blades, said plurality of rotor stages comprising an upstream stage and an adjacent downstream stage, a stator stage positioned between said upstream and downstream rotor stages comprising a plurality of peripherally spaced stator blades with stator passages therebetween bounded by a stator portion of said case means, and means to offset centrifugal pressure in said fluid at said case means arising from rotation of said downstream rotor stage comprising said stator portion of said case means positioned upstream adjacent to said downstream rotor stage and a stator passage inner wall spaced radially inward from said case means for directing flow of said fluid into said downstream rotor stage passages, said stator portion converging toward said axis in the downstream direction more than said inner wall diverges outward from said axis and the portion of said case means opposite the blades of said rotor stage diverging downstream outward from said axis and cooperating with said stator stage to give said flow a component of velocity toward said axis in axial planes thereby producing fluid pressure in said fluid in said rotor stage acting away from said case means and toward said axis, said rotor blades along substantially the whole tips thereof conforming closely to the inner surface of said case means to sustain a substantial pressure difference between the front and rear sides of said rotor, said blades said case means and said hub means cooperating to provide each said rotor passage at the exit thereof with a greater radial depth and cross sectional area than at the inlet of said passage.

References Cited in the file of this patent

UNITED STATES PATENTS

| | | |
|---|---|---|
| 1,447,554 | Jones | Mar. 6, 1923 |

FOREIGN PATENTS

| | | |
|---|---|---|
| 323,658 | Great Britain | Jan. 9, 1930 |
| 386,039 | Great Britain | Jan. 12, 1933 |
| 546,417 | France | Aug. 19, 1922 |